United States Patent
Hernandez Sanchez et al.

(10) Patent No.: US 10,168,697 B2
(45) Date of Patent: Jan. 1, 2019

(54) ASSISTANCE FOR AN AUTONOMOUS VEHICLE USING CROWD-SOURCED RESPONSES

(71) Applicant: AT&T Intellectual Property I, L.P., Atlanta, GA (US)

(72) Inventors: Ivan Dario Hernandez Sanchez, Dallas, TX (US); Roderic Paulk, Wylie, TX (US); Nathaniel Meyer, Plano, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/475,792

(22) Filed: Mar. 31, 2017

(65) Prior Publication Data
US 2018/0284763 A1    Oct. 4, 2018

(51) Int. Cl.
*G05D 1/00* (2006.01)
*G07C 5/00* (2006.01)
(Continued)

(52) U.S. Cl.
CPC ......... *G05D 1/0022* (2013.01); *G06N 3/0436* (2013.01); *G06N 3/08* (2013.01); *G07C 5/008* (2013.01)

(58) Field of Classification Search
CPC combination set(s) only.
See application file for complete search history.

(56) References Cited

U.S. PATENT DOCUMENTS

| | | | |
|---|---|---|---|
| 6,064,926 A | 5/2000 | Sarangapani et al. | |
| 6,356,822 B1 * | 3/2002 | Diaz | G07C 5/008 340/438 |

(Continued)

FOREIGN PATENT DOCUMENTS

| | | |
|---|---|---|
| DE | 10358498 A1 | 7/2005 |
| DE | 102013210395 A1 | 11/2014 |

(Continued)

OTHER PUBLICATIONS

Dominique Bonte, "HERE to launch crowdsourced, real-time Vehicle Sensor Data Services in H1 2017," abirsesearch, https://www.abiresearch,com/blogs/here-launch-crowdsourced-real-time-vehicle-sensor-data-services-h1-2017, Sep. 26, 2016, 2 pages.

(Continued)

*Primary Examiner* — Tuan C To
(74) *Attorney, Agent, or Firm* — Baker Botts, LLP

(57) ABSTRACT

In one embodiment, a control center receives a credential for a responder profile associated with a responder from each responder device in a plurality of responder devices and a signal for assistance from a vehicle. The signal for assistance includes sensor data associated with the vehicle. The control center communicates the sensor data to the responder devices. The control center receives a plurality of responses. Each of the responses is received from one of the responder devices, and each response indicates a possible action to be taken by the vehicle. The control center determines, based at least in part on a response from among the plurality of received responses, an answer to the signal for assistance. The answer indicates an action to be taken by the vehicle. The control center communicates the determined answer to the vehicle.

20 Claims, 7 Drawing Sheets

(51) Int. Cl.
*G06N 3/08* (2006.01)
*G06N 3/04* (2006.01)

(56) References Cited

U.S. PATENT DOCUMENTS

| | | | |
|---|---|---|---|
| 6,854,406 B2 | 2/2005 | Cardoza et al. | |
| 7,581,434 B1* | 9/2009 | Discenzo | G01N 33/2888 73/53.01 |
| 7,979,172 B2 | 7/2011 | Breed | |
| 8,099,308 B2* | 1/2012 | Uyeki | G06Q 10/02 340/539.1 |
| 8,135,804 B2* | 3/2012 | Uyeki | G06Q 10/087 705/28 |
| 8,915,738 B2 | 12/2014 | Mannino | |
| 8,996,224 B1 | 3/2015 | Herbach et al. | |
| 9,008,890 B1 | 4/2015 | Herbach et al. | |
| 9,053,588 B1* | 6/2015 | Briggs | G07C 5/006 |
| 9,098,080 B2 | 8/2015 | Norris et al. | |
| 9,147,353 B1 | 9/2015 | Slusar | |
| 9,208,215 B2 | 12/2015 | Mahaffey et al. | |
| 9,373,149 B2 | 6/2016 | Abhyanker | |
| 9,429,943 B2 | 8/2016 | Wilson et al. | |
| 9,429,947 B1 | 8/2016 | Wengreen et al. | |
| 9,465,388 B1* | 10/2016 | Fairfield | G05D 1/0044 |
| 9,488,979 B1 | 11/2016 | Chambers et al. | |
| 9,494,439 B1 | 11/2016 | Ross et al. | |
| 9,503,608 B2* | 11/2016 | Kurokawa | H04N 1/3255 |
| 9,507,346 B1 | 11/2016 | Levinson et al. | |
| 9,527,515 B2 | 12/2016 | Hunt et al. | |
| 9,606,539 B1* | 3/2017 | Kentley | G05D 1/0214 |
| 9,684,924 B2* | 6/2017 | Wasserman | G06Q 30/0637 |
| 2006/0040239 A1 | 2/2006 | Cummins et al. | |
| 2010/0057511 A1* | 3/2010 | Mansouri | G06Q 10/06311 705/7.13 |
| 2011/0099120 A1* | 4/2011 | Grossman | G06Q 10/06 705/325 |
| 2011/0112720 A1* | 5/2011 | Keep | B60R 16/02 701/36 |
| 2011/0172873 A1* | 7/2011 | Szwabowski | B60K 37/06 701/29.5 |
| 2012/0215641 A1* | 8/2012 | Ohki | G08G 1/0112 705/14.62 |
| 2012/0309424 A1* | 12/2012 | Xiao | H04W 4/023 455/456.3 |
| 2013/0052614 A1 | 2/2013 | Mollicone et al. | |
| 2013/0282210 A1 | 10/2013 | Kolar et al. | |
| 2014/0207535 A1 | 7/2014 | Stefan et al. | |
| 2014/0306799 A1* | 10/2014 | Ricci | B60Q 1/00 340/5.83 |
| 2015/0232065 A1* | 8/2015 | Ricci | B60R 25/01 701/36 |
| 2015/0248131 A1 | 9/2015 | Fairfield et al. | |
| 2015/0254986 A1* | 9/2015 | Fairfield | G08G 1/22 707/687 |
| 2015/0346718 A1 | 12/2015 | Stenneth | |
| 2016/0026180 A1 | 1/2016 | Tsimhoni et al. | |
| 2016/0229404 A1 | 8/2016 | Byun | |
| 2016/0249180 A1 | 8/2016 | Li et al. | |

FOREIGN PATENT DOCUMENTS

| | | | |
|---|---|---|---|
| KR | 20140094116 A * | 7/2014 | |
| WO | WO-2014174822 A1 * | 10/2014 | G08G 1/167 |
| WO | WO-2015180090 A1 * | 12/2015 | G08G 1/096716 |
| WO | WO2016183229 A1 | 11/2016 | |

OTHER PUBLICATIONS

Philip E. Ross, "Tesla Reveals Its Crowdsourced Autopilot Data," IEEE, http://spectrum.ieee.org/cars-that-think/transportation/self-driving/tesla-reveals-its crowdsourced-autopilot-data, May 26, 2016, 2 pages.

Chris Ziegler, "GM could crowdsource your car's data to make better maps for self-driving cars," The Verge, Vox Media, Inc., http://www.theverge.com/platform/amp/2016/1/5/10714374/gm-crowdsourced-self-driving-maps-onstar-ces-2016, Jan. 5, 2016, 5 pages.

Andrew J. Hawkins, "Why Delphi and Mobileye think they have the secret sauce for self-driving cars," The Verge, Vox Media, Inc., http://www.theverge.com/platform/amp/2016/12/1/13791848/delphi-mobileye-self-driving-car-pittsburgh-intel-maps, Dec. 1, 2016, 11 pages.

Alex Hern, "If the age of self-driving cars is upon us, what's keeping them off the roads?," The Guardian, https://www.theguardian.com/technology/2016/aug/22/google-x-self-driving-cars, Aug. 22, 2016, 6 pages.

Naveen Rao et al., "Human-in-the-loop deep learning will help drive autonomous cars," Venture Beat, http://venturebeat.com/2016/06/25/human-in-the-loop-deep-learning-will-help-drive-autonomous-cars/, Jun. 25, 2016, 5 pages.

* cited by examiner

ASSISTANCE FOR AN AUTONOMOUS VEHICLE USING CROWD-SOURCED RESPONSES

TECHNICAL FIELD

The present disclosure generally relates to vehicles, and, in particular, to providing assistance to vehicles.

BACKGROUND

A vehicle, particularly a self-driving vehicle, may encounter situations in which the vehicle or driver of the vehicle is unsure of what action to take next. Vehicles may incorporate cameras and/or other sensors that sense the environment, and may navigate without human input. Vehicles may detect their surroundings using techniques like radar, lidar, GPS, odometry, and computer vision. A driver or vehicle may control the vehicle to cause the vehicle to take a particular action even in situations when the driver or vehicle is unsure of the next action to take.

SUMMARY OF PARTICULAR EMBODIMENTS

According to embodiments of the present disclosure, crowd-sourcing may be used to provide an answer to a signal for assistance from a vehicle.

In one embodiment, a control center receives a credential for a responder profile associated with a responder from each responder device in a plurality of responder devices and a signal for assistance from a vehicle. The signal for assistance includes sensor data associated with the vehicle. The control center communicates the sensor data to the responder devices. The control center receives a plurality of responses. Each of the responses is received from one of the responder devices, and each response indicates a possible action to be taken by the vehicle. The control center determines, based at least in part on a response from among the plurality of received responses, an answer to the signal for assistance. The answer indicates an action to be taken by the vehicle. The control center communicates the determined answer to the vehicle.

Other aspects of the present disclosure will be readily apparent to one skilled in the art from the following figures, descriptions, and claims.

BRIEF DESCRIPTION OF THE DRAWINGS

To assist in understanding the present disclosure, reference is now made to the following description taken in conjunction with the accompanying drawings, in which.

DESCRIPTION OF EXAMPLE EMBODIMENTS

Embodiments of the present disclosure may be understood by referring to FIGS. 1-7, like numerals being used for like and corresponding parts of the various drawings.

Crowd-sourcing a response to a signal for assistance may improve a vehicle's safety. As the control center crowd-sources answers to generate a response, the control center takes into account multiple answers and also other information that may not be directly available to the vehicle (e.g., accidents reported in the area, trajectory taken by previous car, etc.). Moreover, the control center may provide a cost-effective solution to handle unique scenarios, instead of attempting to program a vehicle to solve every unique scenario. In addition, crowd-sourcing an answer provides a failsafe in case one or more responders fails to timely respond to a signal for assistance request or inaccurately responds to a signal for assistance request. Moreover, network efficiency and processing power is improved as a single component receives a signal for assistance from a vehicle, communicates sensor data to a plurality of devices, receives a plurality of responses from the plurality of devices, and communicates an answer to the vehicle. Crowd-sourcing an answer to a signal for assistance may allow for an instant, flexible, and adaptive collaboration, training, and ranking of responders as they respond to signals for assistance. It may also provide a streamlined process to determine a crowd-sourced response to a vehicle's signal for assistance.

Figure 1:
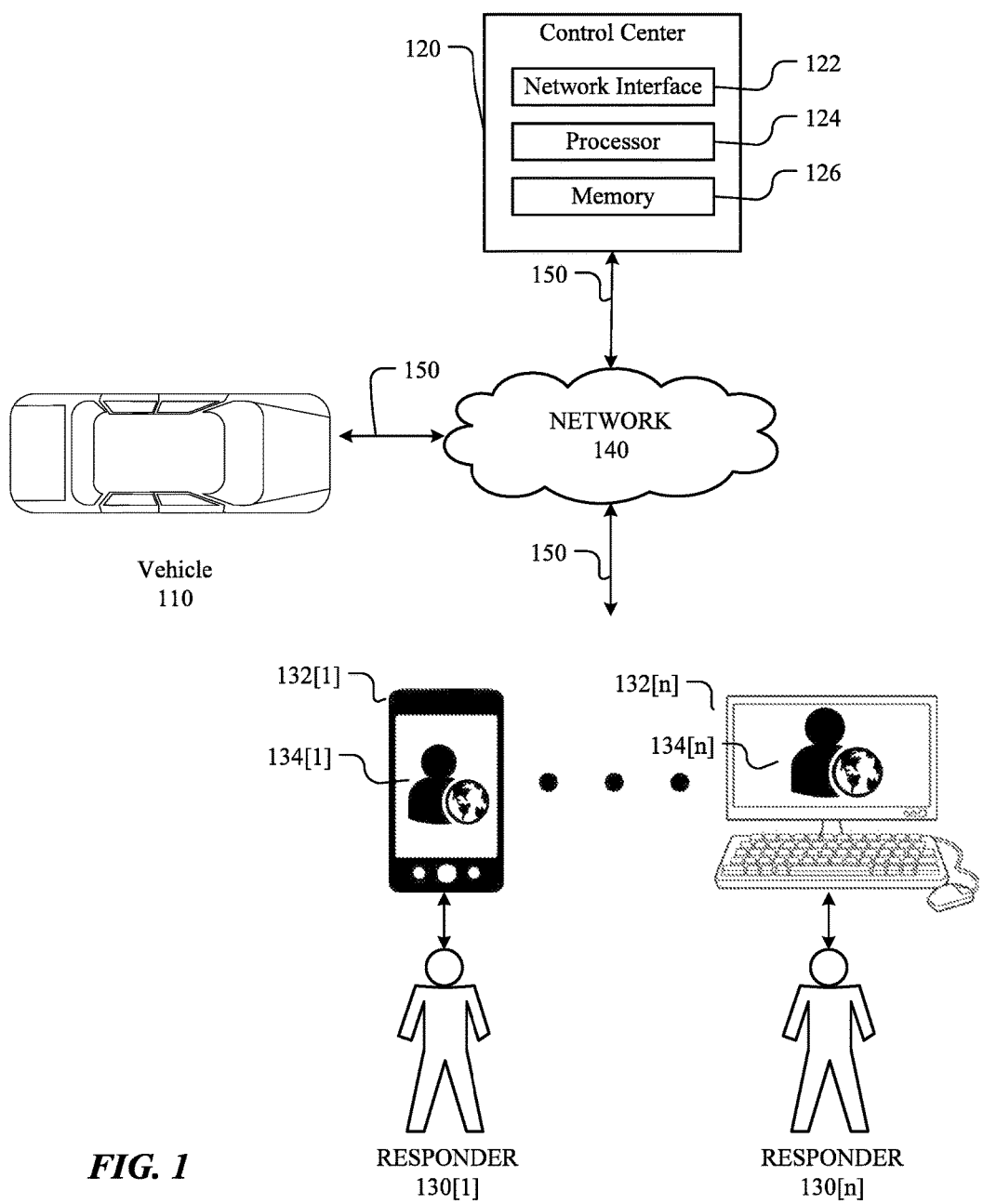
FIG. 1 illustrates an example network environment associated with crowd-sourcing an answer for a signal for assistance.

FIG. 1 illustrates an example network environment 100 associated with crowd-sourcing an answer for a signal for assistance. Generally, network environment 100 provides a crowd-sourced response to a signal for assistance sent by a vehicle 110. As illustrated in FIG. 1, network environment 100 includes one or more vehicles 110, one or more control centers 120, one or more responders 130[1-n] (each of these responders being illustrated as 130[1] . . . 130[n]), one or more responder devices 132[1-n] (each of these responder devices being illustrated as 132[1] . . . 132[n]), one or more responder profiles 134[1-n] (each of these responder profiles being illustrated as 134[1] . . . 134[n]), and network 140. Control center 120 may crowd-source responses from responders 130[1-n] through responder devices 132[1-n] to determine an answer for vehicle 110.

In the illustrated embodiment, example network environment 100 includes one or more vehicles 110. (Vehicle 110 is shown as a land vehicle in this embodiment, although in other embodiments vehicle 110 may be, for example, a water or aerial vehicle.) Vehicle 110 may be any type of vehicle that can communicate a signal for assistance and receive an answer made to the signal for assistance. In an exemplary embodiment, vehicle 110 is a self-driving vehicle, an autonomous vehicle, a semi-autonomous vehicle, or a remote-controlled vehicle. As used herein, a self-driving vehicle means a driverless vehicle that moves independently from a point of origin to a destination. Self-driving vehicles may be capable of being remotely controlled so that a person or computing system outside of vehicle 110 takes responsibility for the movement of the self-driving vehicle.

Vehicle 110 may include one or more cameras as well as various sensors, together with computing hardware and software (not shown) to determine a road situation and run autonomously on a route of travel. In certain embodiments, vehicle 110 may use various sensors to determine a road situation and also to run autonomously. For example, vehicle 110 may include a vehicle detection unit that calculates the position of vehicle 110; a control unit that controls the steering, accelerator, brake system, wipers, headlights, and other adjustable elements of vehicle 110; an information storage system that stores route information and map information; a road detection unit that determines the present road situation, signage, environment and other factors to determine the environment where vehicle 110 is currently present or will be present; and any other sensors that help vehicle 110 determine a road situation and run autonomously. Sensor data may include any output data from the one or more cameras or various sensors associated with vehicle 110. Sensor data may also include any data related to vehicle 110 or an environment of vehicle 110. Example data related to an environment of vehicle 110 may include a traffic report for the vicinity of vehicle 110, weather report for the vicinity of vehicle 110, or output data from one or more cameras or sensors located outside vehicle 110 (e.g., a camera located in a light post). In certain embodiments, vehicle 110 may detect that vehicle 110 encounters a predetermined situation requiring assistance or may detect it is operating in a low-confidence situation (more on this below).

The various sensors and cameras in vehicle 110 can also determine the state of vehicle 110 (e.g., velocity, acceleration, tire pressure, engine temperature, deployment of lane-change-alert systems, deployment of obstacle-avoidance-systems, positioning of headlights in an adaptive headlight system). In addition, the various sensors and cameras in vehicle 110 can also determine a state of the occupants of vehicle 110. For example, the sensors in vehicle 110 can determine whether the occupant in the driver seat has their hands placed on the steering wheel, the alertness of an occupant in the driver seat, and the positioning of occupants in vehicle 101.

Control center 120 may be any network-addressable computing system that receives a credential for responder profile 134 associated with responder 130 from responder device 132, receives a signal for assistance from vehicle 110, communicates sensor data to remote devices 132[1] . . . 132[n], receives a plurality of responses from remote devices 132[1] . . . 132[n], and communicates an answer to vehicle 110. It may be implemented using any suitable type of processing system and may include any suitable combination of hardware, firmware, and software. Control center 120 may include a network service, any suitable remote service, a mainframe, a host computer, a workstation, a web server, a personal computer, a file server, or any other suitable device operable to communicate with vehicle 110 and/or responders 130[1-n]. Control center 120 may include one or more computer systems at one or more locations. For example, an individual control center 120 may exist at a location to receive signal for assistance from one or more vehicles 110, while a separate control center 120 may exist at a separate location to receive responses from responders 130[1-n]. Each control center 120 may include any appropriate input devices, output devices, mass storage media, processors, memory, or other suitable components for receiving, processing, storing, and communicating data. For example, each control center 120 may include a personal computer, workstation, network computer, kiosk, wireless data port, personal data assistant ("PDA"), one or more Internet Protocol ("IP") telephones, smart phones, table computers, one or more servers, a server pool, one or more processors within these or other devices, or any other suitable processing device capable of receiving, processing, storing, and/or communicating information with other components of environment 100. Control center 120 may be a stand-alone computer or may be a part of a larger network of computers associated with an entity.

The functions of control center 120 may also be performed by any suitable combination of one or more servers or other components at one or more locations. The servers may be public or private servers, and each server may be a virtual or physical server. The server may include one or more servers at the same or at remote locations. Also, control center 120 may include any suitable component that functions as a server.

Control center 120 may be located in an assistance center. An assistance center may be one or more places that accommodates responder devices 132[1] . . . 132[n]. In certain embodiments, responder 130 may log in to responder profile 134 using a program running on responder device 132 at an assistance center. In addition, assistance center may also contain one or more data centers to support control center 120.

In the illustrated embodiment, control center 120 includes network interface 122, processor 124, and memory 126. Network interface 122 represents any suitable device operable to receive information from network 140, transmit information through network 140, perform suitable processing of the information, communicate to other devices, or any combination of the preceding. For example, network interface 122 receives a signal for assistance from vehicle 110, transmits information pertaining to the received signal for assistance to responders 130[1-n], receives responses from responders 130[1-n], and/or communicates an answer to the signal for assistance to vehicle 110. Network interface 122 represents any port or connection, real or virtual, including any suitable hardware and/or software, including protocol conversion and data processing capabilities, to communicate through a Local Area Network ("LAN"), Wide Area Network ("WAN"), or other communication system that allows control center 120 to exchange information with vehicle 110, responders 130[1-n], and other components of environment 100.

Processor 124 controls the operation and administration of control center 120 by processing information received from network interface 122 and memory 126. Processor 124 communicatively couples to network interface 122 and memory 126. Processor 124 includes any hardware and/or software that operates to control and process information. For example, processor 124 controls the operation of control center 120. Processor 124 may be a programmable logic device, a microcontroller, a microprocessor, any suitable processing device, or any suitable combination of the preceding. Additionally, processor 124 may be a component external to control center 120. Processor 124 may be located in any location suitable for processor 124 to communicate with control center 120.

Memory 126 holds a database that stores, either permanently or temporarily, received and transmitted information, as well as system software, control software, and other software for control center 120, and a variety of other information. Memory 126 includes any one or a combination of volatile or non-volatile local or remote devices suitable for storing information. For example, memory 126 may include Random Access Memory ("RAM"), Read-only Memory ("ROM"), magnetic storage devices, optical storage devices, or any other suitable information storage device or a combination of these devices. Memory 126 may include any suitable information for use in the operation of control center 120. Additionally, memory 126 may be a component external to control center 120. Memory 126 may be located in any location suitable for memory 126 to communicate with control center 120.

In particular embodiments, responder 130 may be one of the responders in a collection (or "crowd") of responders. Each such responder (illustrated in FIG. 1 as 130[1] . . . 130[*n*]) is one among a total of N, where N is any suitable integer. Each responder 130[1] . . . 130[*n*] may be an individual (human user) that interacts or communicates with control center 120 using responder device 132. Responder 130 may indicate availability to respond to a signal for assistance by logging into a program running on responder device 132 using responder profile 134.

An individual may be motivated to participate as a responder for a variety of reasons. For example, individuals may participate as a responder for monetary reasons (e.g., a business may pay responder 130 according to the number of responses provided) or altruistic reasons (e.g., providing help to occupants in vehicle 110).

As shown in FIG. 1, responder device 132 may be one of the responder devices in a collection of responder devices. Each such responder devices (illustrated here as 132[1] . . . 132[*n*]) is one among a total of N, where N is any suitable integer. Each responder device 132[1] . . . 132[*n*] may be any device that operates and/or communicates with other components of environment 100 regarding responding to a signal for assistance. Each responder device 132[1] . . . 132[*n*] may be associated with a responder 130; for example, responder devices 132[1-*n*] may be associated in a one-to-one correspondence with responders 130[1-*n*], although it is also contemplated that in some embodiments, a single one of the responder devices 132 (e.g., responder device 132[1]) may be associated with multiple responders 130, and that in other embodiments, multiple responder devices 132 may be associated with a single responder 130. Generally, the correspondence between responders 130 and responder devices 132 can be one-to-one, one-to-many, many-to-one, or a mix of these. Responder 130 may log in to responder profile 134 by inputting credentials to an application running on responder device 132. Responder 130 generally uses responder device 132 to communicate responses to control center 120.

Each of the responder devices 132[1] . . . 132[*n*] may communicate with control center 120. For example, responder devices 132[1-*n*] may communicate with control center 120 using radio frequency signals, infrared signals, ZigBee™, Bluetooth™, and/or any other signaling technology and/or protocol, and different ones of responder devices 132[1] . . . 132[*n*] may use the same or different technologies or protocols. As another example, any or all of responder devices 132[1-*n*] may communicate with components of environment 100 through network 140.

Responder device 132 may be a network-addressable computing system, such as a computer, a laptop, a wireless or cellular telephone, an electronic notebook, a personal digital assistant, a tablet, an augmented/virtual reality device (e.g., Google Glass™, Microsoft HoloLens™, Oculus Rift™, HTC Vive™, Sony PlayStation Virtual Reality™, and Samsung Gear Virtual Reality™), or any other device capable of receiving and/or communicating information with other components in environment 100. Responder device 132 may provide a replicated view of the occupant in the driver seat in vehicle 110, and may supplement the view by adding computer-generated input. For example, responder device 132 may overlay a designated navigation route and may provide a visual or audible indication of nearby hazards (e.g., child on the sidewalk). In certain embodiments, responder 130 may interact with responder device 132 to receive additional information or additional views of vehicle 110. For example, responder 130 may be immersed in a virtual reality replica of the driver view of vehicle 110 by using responder device 132. Responder 130 may interact with the instrumentation in vehicle 110 using gesture control. Responder device 132 may also include a user interface, keypad, a display, a microphone, a steering wheel and pedal controller (e.g., HURT Racing Wheel Apex™), or other appropriate terminal equipment usable by responder 130. In some embodiments, an application executed by responder 130 may perform the functions described herein. Responder device 132 may generate, store, receive, and send data associated with responder profile 134. For example, responder device 132 may generate a response associated with responder 130 based on input received by responder 130.

Responder profile 134 may be one responder profile in a collection of responder profiles 134[1-*n*]. Each such responder profile (illustrated here as 134[1] . . . 134[*n*]) is one among a total of N, where N is any suitable integer. Responder profile 134 may be a digital representation of responder 130. Each responder profile 134[1] . . . 134[*n*] may be associated with a responder 130; for example, responder profile 134[1-*n*] may be associated in a one-to-one correspondence with responders 130[1-*n*], although it is also contemplated that in some embodiments, a single one of the responder profile 134 (e.g., responder profile 134[1]) may be associated with multiple responders 130, and that in other embodiments, multiple responder profiles 134 may be associated with a single responder 130. In the embodiment wherein multiple responder profiles 134 may be associated with a single responder 130, a parent profile may associate multiple responder profiles 134 to a single responder 130. Generally, the correspondence between responders 130 and responder profiles 134 can be one-to-one, one-to-many, many-to-one, or a mix of these.

Responder profile 134 may identify one or more characteristics of responder 130. Memory 126 may store responder profile 134 and may include information concerning, for example, a rating for responder 130, an age of responder 130, a gender of responder 130, background information of responder 130, driving statistics associated with responder 130, a latency for responder device 132 associated with responder 130, a relationship between responder 130 and other individuals (e.g., occupants of vehicle 110 or other responders), etc.

Control center 120 may receive a credential for responder profile 134 from responder device 132. A credential may include any type of identification that identifies responder profile 134. For example, credential may include a username/password combination, an answer to a security question, or device information of responder device 134. Responder 130 may provide the credential associated with responder profile 134 to responder device 132 by inputting the credential using an input device for responder device 132. In certain embodiments, control center 120 may associate responder device 132 with responder 130 by associating the credential for responder profile 134 with responder device 132 that communicated the credential. Typically, responder device 132 will communicate a credential for responder profile 134 to control center 120 before being able to respond to a signal for assistance.

Network 140 can be implemented using any suitable network or networking technology. For example, one or more portions of network 140 may include an ad hoc network, an intranet, an extranet, a virtual private network ("VPN"), LAN, a wireless LAN ("WLAN"), a WAN, a wireless WAN ("WWAN"), a metropolitan area network ("MAN"), a portion of the Internet, a portion of the Public Switched Telephone Network ("STN"), a cellular telephone network, or a combination of two or more of these.

Communication links 150 may connect vehicle 110, control center 120, and responders 130[1-n] to network 140 or to each other so that they can communicate. Any suitable communication links 150 may be used to provide this communication capability. In particular embodiments, one or more communication links 150 include one or more wireline (such as, for example, Digital Subscriber Line ("DSL") or Data Over Cable Service Interface Specification ("DOCSIS")), wireless (such as, for example, 2G, 3G, 4G, or 5G cellular, Wi-Fi, or Worldwide Interoperability for Microwave Access ("WiMAX")), or optical (such as, for example, Synchronous Optical Network ("SONET") or Synchronous Digital Hierarchy ("SDH")) links. In particular embodiments, one or more communication links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such communication links 150. Communication links 150 need not necessarily be the same throughout network environment 100. One or more first communication links 150 may differ in one or more respects from one or more second communication links 150.

In an exemplary embodiment, control center 120 may receive a credential for responder profile 134 associated with responder 130 from responder device 132. Responder 130 may provide the credential associated with responder profile 134 to responder device 132 by inputting the credential using an input device for responder device 132. In certain embodiments, control center 120 authenticates the credential received from responder device 132 for responder profile 134. Control center 120 may associate responder device 132 with responder 130 by associating the credential for responder profile 134 with responder device 132 that communicated the credential.

Control center 120 may receive a signal for assistance from vehicle 110. Typically, vehicle 110 communicates a signal for assistance when requesting instructions for the next action to be taken by vehicle 110. The signal for assistance may include one of more attributes of vehicle 110. For example, a signal for assistance may include diagnostics of vehicle 110, sensor data associated with one or more cameras and/or sensors of vehicle 110, occupant information for vehicle 110, live video feeds of the roads for vehicle 110, information regarding nearby vehicle 110, and/or any other information relevant for control center 120 to make a decision on the next action to be taken by vehicle 110.

In certain embodiments, the signal for assistance includes a confidence level. The confidence level may represent, for example, a probability of a failure if control center 120 does not intervene with the operation of vehicle 110. A failure may represent a crash by vehicle 110 into an object or a technology failure, such as an abnormal sensor reading. The higher the confidence level, the lower the probability of a failure if vehicle 110 continues to drive autonomously, and the lower the confidence level, the higher the probability of a failure if vehicle 110 continues to drive autonomously.

Vehicle 110 and/or control center 120 may calculate a confidence level using some, none, or all of the following factors:

An identification of an unexpected object in an area associated with vehicle 110: Vehicle 110 and/or control center 120 may identify an unexpected object in area associated with vehicle 110. For example, an unexpected object may be a tree that falls into the upcoming road of the path of vehicle 110 because the tree is in an unexpected location. Note that a previously unexpected object may change to an expected object. In the above example, as more vehicles 110 traverse the path with the tree in the road, the once unexpected object may change to an expected object. In addition, an unexpected object may be dependent on the amount of data that vehicle 110 and/or control center 120 collected for the area associated with vehicle 110. As an example, vehicle 110 and/or control center 120 may more frequently identify unexpected objects in a recently-developed area that vehicle 110 and/or control center 120 has collected little data on.

An awareness level of an occupant in the driver seat in vehicle 110: Vehicle 110 and/or control center 120 may determine an awareness level of the occupant in the driver seat in vehicle 110. For example, vehicle 110 may communicate that the driver of vehicle 110 is asleep, inebriated, or incapacitated, or any other factors such that vehicle 110 and/or control center 120 can determine an awareness level associated with the occupant in the driver seat in vehicle 110. In certain embodiments, the sensors and cameras in vehicle 110 determines the awareness level of the occupant in the driver seat in vehicle 110. For example, the sensors in vehicle 110 can determine whether the occupant in the driver seat has not placed their hand on the steering wheel for a period of time or the alertness of the occupant in the driver seat.

A number of accidents reported in an area associated with vehicle 110: Vehicle 110 and/or control center 120 may identify accidents in the area surrounding vehicle 110. For example, a low confidence level may be associated with an area that recently reported several accidents. The area associated with vehicle 110 may be a geographic area of vehicle 110, a radius around vehicle 110, or any other type of measurement that indicates a vicinity near vehicle 110.

A number of objects in close proximity to vehicle 110: Vehicle 110 and/or control center 120 may identify the number of humans, self-driving vehicles, human-driven vehicles, and/or other objects near vehicle 110. For example, a low confidence level may be associated with several humans that are near vehicle 110. Vehicle 110 may also identify the speed and proximity of the objects near vehicle 110. The proximity may be a pre-determined threshold established by an administrator. The proximity may also be adaptive based on the zoning of the area, nearby pedestrians, accidents reported in the area, or any other information that may influence the need to account for objects in an adaptive proximity to vehicle 110.

Zoning of the area associated with vehicle 110: Vehicle 110 and/or control center 120 may identify the zoning of the area surrounding vehicle 110. Zoning of an area may indicate an attribute specified for an area associated with vehicle 110. The zoning may include speed zoning, construction zoning, school zoning, or any other type of zoning that attributes particular characteristics to an area of the road for vehicle 110.

Failure of one or more sensors associated with vehicle 110: Vehicle 110 and/or control center 120 may identify one or more failed sensors associated with vehicle 110. In certain embodiments, a sensor may be affected by the environment (e.g., the weather) and may not be operating at its full functionality. A failing sensor may be attributable to a lower confidence level.

Other factors that may affect the probability of a failure if control center 120 does not intervene with the operation of vehicle 110. For example, weather conditions of the area associated with vehicle 110 (e.g., rain, cloudy, nighttime, etc.) may affect the probability of a failure. In addition, other environmental conditions, such as the conditions of the area associated with vehicle 110 (e.g., condition of road), may affect the probability of a failure.

The method for calculating the confidence level may involve the usage of a set of functions (e.g., scalar functions) associated with each factor. The outputs of each of these functions can be weighted by a set of coefficients and then combined to provide an objective confidence level, which represents the probability of a failure if control center 120 does not intervene with the operation of vehicle 110. For example, a calculation of a quantitative confidence level, Q, for vehicle 110 is generally represented by Equation 1.

$$Q = \sum_{n=1}^{N} C_n F_n(Y) \qquad (1)$$

In some embodiments, Y represents sensor data from vehicle 110. In some embodiments, $F_n(Y)$ represents a set of N functions (e.g., scalar functions) of the input sensor data Y. Note that N is any suitable integer. Each of $F_n(Y)$ may be a function of a single sensor data or of a series of sensor data at different time intervals. In addition, each of $F_n(Y)$ may involve, for example, a single mathematical operation or multiple mathematical operations. In some embodiments, each of $F_n(Y)$ outputs a scalar value. For example, each of $F_n(Y)$ may output a scalar value related to a factor used to determine a confidence level for vehicle 110. However, the output may also be, for example, a vector, a matrix, etc.

In some embodiments, the resulting output from each of the N functions $F_n(Y)$ is weighted by a corresponding coefficient $C_n$. In some embodiments, each weighting coefficient is a scalar value. However, the weighting coefficients can also be, for example, vectors, matrices, etc. In some embodiments, the summation in Equation 1 can also include cross functions such as, for example, $C_k F_1(Y) F_2(Y)$, or other higher-order terms, etc.

Given the set of functions and feedback received from vehicle 110, an optimization process can be used to select the coefficients $C_n$ for n=0, 1, . . . N, so that the calculated values of the quantitative confidence level Q collectively correlate to the probability of a failure if control center 120 does not intervene with the operation of vehicle 110.

As discussed herein, the confidence level may be based on a sum (weighted or otherwise) of a plurality of factors. Moreover, the confidence level determination may include a number of additional determination techniques, such as statistical regression analysis and statistical classifiers such as neural networks, decision trees, Bayesian classifiers, fuzzy logic-based classifiers, machine learning (e.g., deep learning), and statistical pattern recognition.

Generally, vehicle 110 communicates a signal for assistance when the confidence level associated with vehicle 110 is (or falls) below a predetermined threshold. The threshold may be a preset score or may be an adaptive score based on information present in vehicle 110. In certain embodiments, vehicle 110 and/or control center 120 may predict the probability that vehicle 110 may soon enter a low confidence level, and vehicle 110 may communicate a signal for assistance even before a confidence level associated with vehicle 110 falls below a predetermined threshold (thereby providing responders 130[1] . . . 130[n] with time to become aware of the situation). In alternative embodiments, vehicle 110 may communicate a signal for assistance when vehicle 110 encounters an area associated with a low confidence level (e.g., an active school zone area).

By periodically calculating a confidence level, vehicle 110 may determine whether vehicle 110 may benefit from control center 120 controlling the actions for vehicle 110 to take. The situation may last for a period of time when vehicle 110 continues to have a low confidence level. Using responder device 132, responder 130 may continuously provide responses for vehicle 110 in these low-confidence situations. Because responders 130[1] . . . 130[n] are aware of the present situation that vehicle 110 is encountering, responders 130[1] . . . 130[n] may be able to also provide a quick response to vehicle 110 during an unexpected event (e.g., a child running into the street in a school zone) in these low-confidence situations.

In certain embodiments, vehicle 110 may perform statistical analysis on a sudden change in confidence level to determine whether to communicate a signal for assistance or to autonomously perform an action. For example, if vehicle 110 identifies a large variation in the confidence level (e.g., a vehicle immediately braking ahead of vehicle 110), vehicle 110 may autonomously perform an action instead of communicating a signal for assistance to control center 120.

In an exemplary embodiment, control center 120 determines an answer to the signal for assistance based at least in part on a response from a plurality of responses received from responders 130[1-n]. In particular, control center 120: (1) determines responders 130[1-n] from among a set of available responders to respond to a signal for assistance; (2) determines an answer to the signal for assistance using crowd-sourcing; and (3) provides an adaptive ranking to responder 130.

I. Determining a Plurality of Responders from Among a Set of Available Responders to Respond to a Signal for Assistance In certain embodiments, control center 120 determines responders 130[1-n] from among a set of available responders to respond to a signal for assistance. The set of available responders may include those responder profiles 134[1-n] that indicate that the associated responders 130[1-n] are available to respond to a signal for assistance. For example, certain responders 130 may indicate that they are currently unavailable (e.g., stepped away from responder device 132) in the corresponding responder profile 134. In certain embodiments, control center 120 communicates a message, such as a text message, a push notification, or an indication in an application running on responder device 132 in order to prompt responder 130 to respond. Control center 120 will determine an answer to the signal for assistance from the responses received from responders 130[1-n].

In certain embodiments, control center 120 may determine responders 130[1-n] from among a set of available responders based on the confidence level associated with the signal for assistance and a rating for each responder 130 (that is, a rating for responder 130 associated with responder profile 134—more on this below). For example, an extremely low confidence level associated with the signal for assistance by vehicle 110 (indicating, for example, that vehicle 110 encounters an unexpected object) may result in control center 120 selecting a large number of responders 130[1-n] with a high rating to respond to the signal for assistance. Similarly, a moderate confidence level for a signal for assistance may be associated with a set of responders 130[1-n] with a mediocre rating. In certain embodiments, the rating corresponds with tiers established for each responder 130. For example, a high rating for a responder 130 may mean that responder 130 belongs to a higher tier, whereas a low rating for responder 130 may mean that responder 130 belongs to a lower tier. Responder 130 may be promoted or demoted from tiers based on an improvement or decline in a rating for responder 130. The rating for responder 130 will be described in further detail below.

Moreover, vehicle 110 may subscribe to a particular tiered subscription program that provides vehicle 110 access to responders 130[1-n] with a high rating and/or a higher number of responders 130[1-n] in certain embodiments. As an example, vehicle 110 and/or occupants of vehicle 110 may subscribe to the highest-tiered subscription program that provides vehicle 110 with responders 130[1-n] with the highest ratings and also a higher number of responders 130[1-n] that respond to the signal for assistance.

Control center 120 may communicate the signal for assistance (which may include the sensor data associated with vehicle 110) to responder devices 132[1-n]. Responder 130 may analyze the sensor data using an application running on responder device 132 to determine a possible next action for vehicle 110. In certain embodiments, an application running on responder device 132 recreates the view of the occupant in the driver seat of vehicle 110 on responder device 132. Responder 130 may alter the recreated view on responder device 132 to show more or less information from sensor data. Responder 130 may also use an input controller, such as a steering wheel and pedals, to provide a response. In certain embodiments, the application running on responder device 132 may analyze the sensor data associated with vehicle 110 and recommend a response to responder 130. For example, the application running on responder device 132 may recommend to responder 130 that vehicle 110 should drive around a tree impeding a road.

II. Determining an Answer to the Signal for Assistance Using Crowd-Sourcing

In response to receiving sensor data from control center 120, responders 130[1-n] may each communicate a response. Each such responder device 132 may determine the response to communicate based on information provided to responder device 132 by vehicle 110 and/or control center 120, as well as information available locally to responder 130 and input from responder 130 associated with responder device 132. Responder device 132 can also determine its response in part through local computation and/or by using cloud-based or other resources available to it, as through network 140.

The response of responder device 132 may indicate a possible action for vehicle 110 to take. An example action for vehicle 110 may be an instantaneous movement, change in direction, and/or acceleration/deceleration. As another example, the response may indicate a mode in which vehicle 110 is to drive, a set of actions for vehicle 110 to take during a time period, or an action for vehicle 110 to overcome the obstacle presented by the signal for assistance. Control center 120 may communicate the signal for assistance to responder devices 132[1-n] in order for responder devices 132[1-n] to respond with an action for vehicle 110 to take. The response may be a message, a signal, or any other type of indication such that control center 120 understands the response provided by responder 130.

Control center 120 may determine an answer based in part on a response from the plurality of responses received. Control center 120 may first determine a set of valid responses from the plurality of responses received. A valid response may include a timely response that meets the preconditions of a response. For example, an invalid response may be a response that indicates vehicle 110 accelerates faster than the capability of vehicle 110.

Control center 120 may determine an answer by computing a score for each response and selecting a highly-ranked response. First, control center 120 may calculate a variance for each response by comparing each response to the plurality of responses received. The variance may represent, for example, a measurement indicating how different a response is from the mean of the plurality of responses. Control center may calculate a variance for a response, for example, by calculating a squared deviation of the response from an average of the plurality of responses. Alternatively, control center 120 may calculate a deviation for each response by determining a standard deviation for the plurality of responses and comparing the response to the standard deviation.

Control center 120 may compute a score for each response based at least in part on the variance for the response to the plurality of responses. The computation of the score is described in further detail below. The score itself is any type of metric that ranks responses against each other. For example, the score may be an alphabetical grade, a numerical grade, a percentage, or any other type of metric.

Basing the score in part on the variance for each response may help to ensure that the answer is crowd-sourced, rather than being based on a single input. In other words, basing the score in part on the variance for each response helps to ensure that a wayward response may receive a lower score than a response that is more similar to the majority of responses. This may help in the situation of a rogue responder that submits an improper response, because that improper response will receive a lower score than other proper responses submitted.

Control center 120 may then rank the responses calculated for each response based on their respective scores. Control center 120 may rank the responses such that a lower score indicates the best response, a higher score indicates the best response, or any other type of ranking such that control center 120 may select at least one response to transmit as an answer to vehicle 110.

Control center 120 may generate an answer by selecting a response that is ranked greater than, less than, or equal to a predetermined threshold. A predetermined threshold may be set as an absolute score or as the score of the lowest-ranked received response. In certain embodiments, control center 120 selects the response with the best score. In other embodiments, control center 120 may perform a statistical analysis on a set of responses that are ranked higher or lower than a predetermined threshold, and develop a response based on that statistical analysis.

In certain embodiments, control center 120 calculates a score for each response based in part on the variance for the response to the plurality of responses and the rating for responder 130. A more detailed description of a rating for responder 130 is explained further below. As an example, control center 120 may provide a weighted average for the variance for the response along with the rating for responder 130.

Control center 120 may communicate the answer to vehicle 110. The answer may indicate an action to be taken by vehicle 110. Vehicle 110 may perform the action indicated by the communicated answer. For example, vehicle 110 may move the steering wheel clockwise by 10° and decrease speed by 5 miles per hour when the communicated answer indicates that vehicle 110 should move the steering wheel clockwise by 10° and decrease speed by 5 miles per hour. In certain embodiments, vehicle 110 may cede control of the driving operation of vehicle 110 to control center 120. In alternative embodiments, vehicle 110 may maintain control of other adjustable elements of vehicle 110 (e.g., wiper speed and headlights).

Adaptively Ranking a Responder

In an exemplary embodiment, control center 120 calculates a rating for responder 130 based on several characteristics. The rating for responder 130 represents the predicted quality of response by responder device 132 associated with responder 130 to a signal for assistance. Control center 120 may utilize the following characteristics to calculate a rating for responder 130:

- A number of miles driven by responder 130: A rating for responder 130 may be affected by the number of miles driven by responder 130. The number of miles driven may include the miles that vehicle 110 travelled while performing an action indicated by a response provided by responder device 132 associated with responder 130. In other embodiments, the number of miles driven may include training miles under a controlled situation that responder 130 has performed. In the controlled situation, responder 130 may use responder profile 134 with a training module to associate the number of miles driven in the controlled situation to responder 130.
- An amount of time driven by responder 130: A rating for responder 130 may be affected by the amount of time driven by responder 130. The amount of time may include the time length that vehicle 110 performed an action indicated by a response provided by responder device 132 associated with responder 130. In certain embodiments, the amount of time driven may include length of training under a controlled situation that responder 130 has performed. In the controlled situation, responder 130 may use responder profile 134 with a training module to associate the number of miles driven in the controlled situation to responder 130.
- A number of driving accidents caused by responder 130: A rating for responder 130 may be affected by the number of driving accidents caused by responder 130. The number of driving accidents caused by responder 130 may be driving accidents that occurred while responder 130 provided actions for vehicle 110 to follow or driving accidents that occurred while responder 130 was physically driving. The number of driving accidents caused by responder 130 may also include traffic infractions, misdemeanors, felonies, or any other type of indication relating to the ability of responder 130 to input a proper response to a signal for assistance from vehicle 110.
- A number of previous responses provided by responder 130: A rating for responder 130 may be affected by the number of previous responses provided by responder 130. Typically, a number of accurate previous responses indicates a higher rating, whereas a number of inaccurate previous responses or lack of responses indicates a lower rating. An accurate previous response may include a selected response by control center 120 and/or a previous response that has little variance from a selected response by control center 120. Likewise, an inaccurate previous response may include a previous response not selected by control center 120 and/or a previous response that has a large variance from a selected response by control center 120.
- Experience of responder 130 with a zoning of an area associated with vehicle 110: A rating for responder 130 may be affected by the experience of responder 130 with a zoning of an area associated with vehicle 110. Zoning of an area may indicate an attribute specified for an area associated with vehicle 110. The zoning may include speed zoning, construction zoning, school zoning, or any other type of zoning that attributes particular characteristics to an area associated with vehicle 110. Additionally, responder 130 may participate in training to deal with a specific type of zoning. Generally, the more experience responder 130 has with handling a zoning of an area associated with vehicle 110, the higher the rating for responder 130.
- Experience of the responder with a vehicle category associated with vehicle 110: A rating for responder 130 may be affected by a vehicle category associated with vehicle 110. A vehicle category may group vehicles that are similar in make, model, year, vehicle type, dimensions, characteristics of the engine, luxury level, the type of wheel drive, usage (e.g., commercial or passenger), style, mileage, or any other type of characteristics of vehicle 110 that helps categorize vehicle 110 with other similar vehicles 110. Additionally, responder 130 may participate in training to deal with a specific vehicle category. Generally, the more experience responder 130 has with handling a vehicle category associated with vehicle 110, the higher the rating for responder 130.
- Feedback associated with the previous responses communicated by responder device 132 associated with responder 130: Responder device 132 associated with responder 130 may have communicated a response to a previous signal for assistance by vehicle 110. In this circumstance, the rating for responder 130 may be affected by feedback received from vehicle 110 for the previous response. For example, responder 130 may have previously provided a response that control center communicated as an answer to a signal for assistance by vehicle 110. Vehicle 110 may have provided feedback indicating the result of the action that vehicle 100 took was successfully completed. In this example, responder 130 may exhibit a higher rating.
- A rating for the responder by an occupant of the vehicle: One or more occupants (the passengers and/or the driver, if any) of vehicle 110 may have previously provided a rating for responder 130. Occupants of vehicle 110 may provide a rating for responder 130 to control center 120 after responder device 132 associated with responder 130 communicates a response to a signal for assistance from vehicle 110. In the circumstance that an occupant of vehicle 110 previously rated responder 130, the rating for responder 130 may be affected by that rating from the occupant. As an example, an occupant of vehicle 110 may have previously rated the response associated with responder 130 as low, and control center 130 may consequently lower the rating for responder 130.
- A relationship between an occupant of vehicle 110 and responder 130: In certain embodiments, one or more occupants of vehicle 110 may have a relationship with responder 130. For example, control center 120 may connect to one or more social networks of the one or more occupants of vehicle 110 and determine that a social network profile of responder 130 has a relationship to a social network profile of the one or more occupants of vehicle 110. For example, responder 130 may be a parent of an occupant of vehicle 110. In other embodiments, one or more occupants of vehicle 110 may establish a list of trusted responders 130[1-$n$] to provide the next action for vehicle 110. The rating for responder 130 may be affected by the relationship between one or more occupants of vehicle 110 and responder 130.

Other factors that may indicate the proficiency of responder 130 to provide a proper response to a signal for assistance by vehicle 110 are also considered in order for control center 120 to calculate a rating for responder 130. For example, the experience of responder 130 with the weather conditions of the area associated with vehicle 110 (e.g., rain, cloudy, nighttime, etc.) may affect the proficiency of responder 130 to provide a proper response to a signal for assistance by vehicle 110.

The method for calculating a rating for responder 130 may involve the usage of a set of functions (e.g., scalar functions) associated with each factor. The outputs of each of these functions can be weighted by a set of coefficients and then combined to provide an objective rating for responder 130, which represents a predicted quality of response associated with responder 130 to a signal for assistance. For example, a calculation of a quantitative rating, R, for a particular responder profile is generally represented by Equation 2.

$$R = \sum_{n=1}^{N} C_n F_n(Y) \qquad (2)$$

In some embodiments, Y represents responder profile 134. In some embodiments, $F_n(Y)$ represents a set of N functions (e.g., scalar functions) of the responder profile Y. Note that N is any suitable integer. Each of $F_n(Y)$ may involve, for example, a single mathematical operation or multiple mathematical operations. For example, each of $F_n(Y)$ may represent a function pertaining to a characteristic used to calculate a rating for responder 130. In some embodiments, each of $F_n(Y)$ outputs a scalar value. However, the output may also be, for example, a vector, a matrix, etc. In some embodiments, the resulting output from each of the N functions $F_n(Y)$ is weighted by a corresponding coefficient $C_n$. In some embodiments, each weighting coefficient is a scalar value. However, the weighting coefficients can also be, for example, vectors, matrices, etc. In some embodiments, the summation in Equation 2 can also include cross functions such as, for example, $C_k F_1(Y) F_2(Y)$, or other higher-order terms, etc.

Given the set of functions and feedback received from vehicle 110, an optimization process can be used to select the coefficients $C_n$ for n=0, 1, . . . N, so that the calculated values of the quantitative rating R collectively correlate to the quality of response associated with responder 130 to a signal for assistance.

One or more of the coefficients $C_n$ may use a decay factor in which the strength of the coefficient decays as a function of time (e.g., the weight of feedback for a response associated with responder 130 received one year ago may be weaker than the weight of feedback for a response associated with responder 130 received one month ago). Furthermore, different factors may decay at different rates. Various decay mechanisms may be used for this purpose. A particular function may use an exponential decay to decay the factors associated with responder 130 based on a function of time. As another example, the decay is implemented by selecting only those factors associated with responder 130 that occurred within a specific window of time, such as, for example, one year.

As discussed herein, the rating may be based on a sum (weighted or otherwise) of a plurality of factors. Moreover, the rating determination may include a number of additional determination techniques, such as statistical regression analysis and statistical classifiers such as neural networks, decision trees, Bayesian classifiers, fuzzy logic-based classifiers, machine learning (e.g., deep learning), and statistical pattern recognition.

Control center 120 may also adjust the rating for responder 130 based in part on the selected response. For example, if a response of responder 130 is significantly different from the selected response of control center 120, the rating for responder 130 may be impacted negatively. Adjusting the rating for responder 130 may be beneficial while vehicle 110 is in a low-confidence situation for a long period of time. For example, while responder 130 continuously provides responses to signals for assistance by vehicle 110, control center 120 may periodically adjust the rating for responder 130 while vehicle 110 is still in a low confidence situation. In certain embodiments, control center 120 may temporarily adjust the rating for responder 130 during a time period that responder 130 is responding to signals for assistance by vehicle 110. The severity of adjustment of the rating for responder 130 may be based on one, some, or all of the following characteristics:

Variance for the response corresponding to responder 130: The variance between the response received from responder 130 and the selected response may affect the severity of adjustment of the rating for responder 130. For example, a large variance between the response received from responder 130 and the selected response may correspond to a large adjustment of the rating for responder 130. Alternatively, a small variance between the response received from responder 130 and the selected response may only slightly adjust the rating for responder 130. In certain embodiments, control center 120 may calculate a variance in the proposed direction for vehicle 110 in the response received from responder 130 against the proposed direction in the selected response. Similarly, in certain embodiments, control center 120 may calculate a variance in the proposed acceleration for vehicle 110 in the response received from responder 130 against the proposed acceleration in the selected response.

Received feedback from vehicle 110 and/or occupants of vehicle 110: In certain embodiments, vehicle 110 and/or one or more occupants of vehicle 110 may provide feedback on the signal response for the next action of vehicle 110. The received feedback may positively or negatively affect the rating for responder 130 that provided the selected response. The type of received feedback may also affect the severity of the adjustment for the rating for responder 130. In certain embodiments, vehicle 110 and/or occupants of vehicle 110 may also provide feedback on responses not selected by control center 120. The provided feedback on the responses may affect the severity of the adjustment of the rating for responders 130[1-n] associated with those responses.

Latency of the response by responder device 132: The latency of the response by responder device 132 may affect the severity of the adjustment of the rating. The latency of the response may indicate a response time length for responder device 132 to provide a response to a signal for assistance. Typically, a quicker response time correlates to a better rating, whereas a slower response time correlates to a lower rating. The adjustment of the rating based on the response time may also take into account the variance for the response associated with responder 130 to the plurality of received responses. For example, a quick response time that leads to a highly-variant response may negatively affect the rating for responder 130. Similarly, a slow response time that leads to a selected answer may positively affect the rating for responder 130.

Other factors that indicate whether responder 130 efficiently selected a proper or improper decision as the next action for vehicle 110 are also considered as characteristics that affect the rating for responder 130.

In certain embodiments, control center 120 may adjust the rating for responder 130 by an increment. For example, control center 120 may determine an increment to adjust the rating for responder 130, and then temporarily adjust the rating for responder 130 by the determined increment. The method for calculating the increment to adjust the rating for responder 130 may involve the usage of a set of functions (e.g., scalar functions) associated with each factor. The outputs of each of these functions can be weighted by a set of coefficients and then combined to provide an increment to adjust a rating for responder 130. For example, a calculation of a quantitative score adjustment increment, I, to adjust a rating for responder 130 based on a response provided by responder 130 is generally represented by Equation 3.

$$I = \sum_{n=1}^{N} C_n F_n(Y) \quad (3)$$

In some embodiments, Y represents a response provided by responder 130. In some embodiments, $F_n(Y)$ represents a set of N functions (e.g., scalar functions) of the responder profile Y. Note that N is any suitable integer. Each of $F_n(Y)$ may involve, for example, a single mathematical operation or multiple mathematical operations. For example, each of $F_n(Y)$ may represent a function pertaining to a characteristic used to calculate a severity of adjustment of the rating. In some embodiments, each of $F_n(Y)$ outputs a scalar value. However, the output may also be, for example, a vector, a matrix, etc. In some embodiments, the resulting output from each of the N functions $F_n(Y)$ is weighted by a corresponding coefficient $C_n$. In some embodiments, each weighting coefficient is a scalar value. However, the weighting coefficients can also be, for example, vectors, matrices, etc. In some embodiments, the summation in Equation 3 can also include cross functions such as, for example, $C_k F_1(Y) F_2(Y)$, or other higher-order terms, etc.

As discussed herein, the increment of adjustment may be based on a sum (weighted or otherwise) of a plurality of factors. Moreover, the adjustment determination may include a number of additional determination techniques, such as statistical regression analysis and statistical classifiers such as neural networks, decision trees, Bayesian classifiers, fuzzy logic-based classifiers, machine learning (e.g., deep learning), and statistical pattern recognition.

Modifications, additions, or omissions may be made to network environment 100. For example, network environment 100 may include any number of control centers 120. Furthermore, the components of network environment 100 may be integrated or separated. For example, vehicle 110 and control center 120 may be incorporated into a single component.

Figure 2:
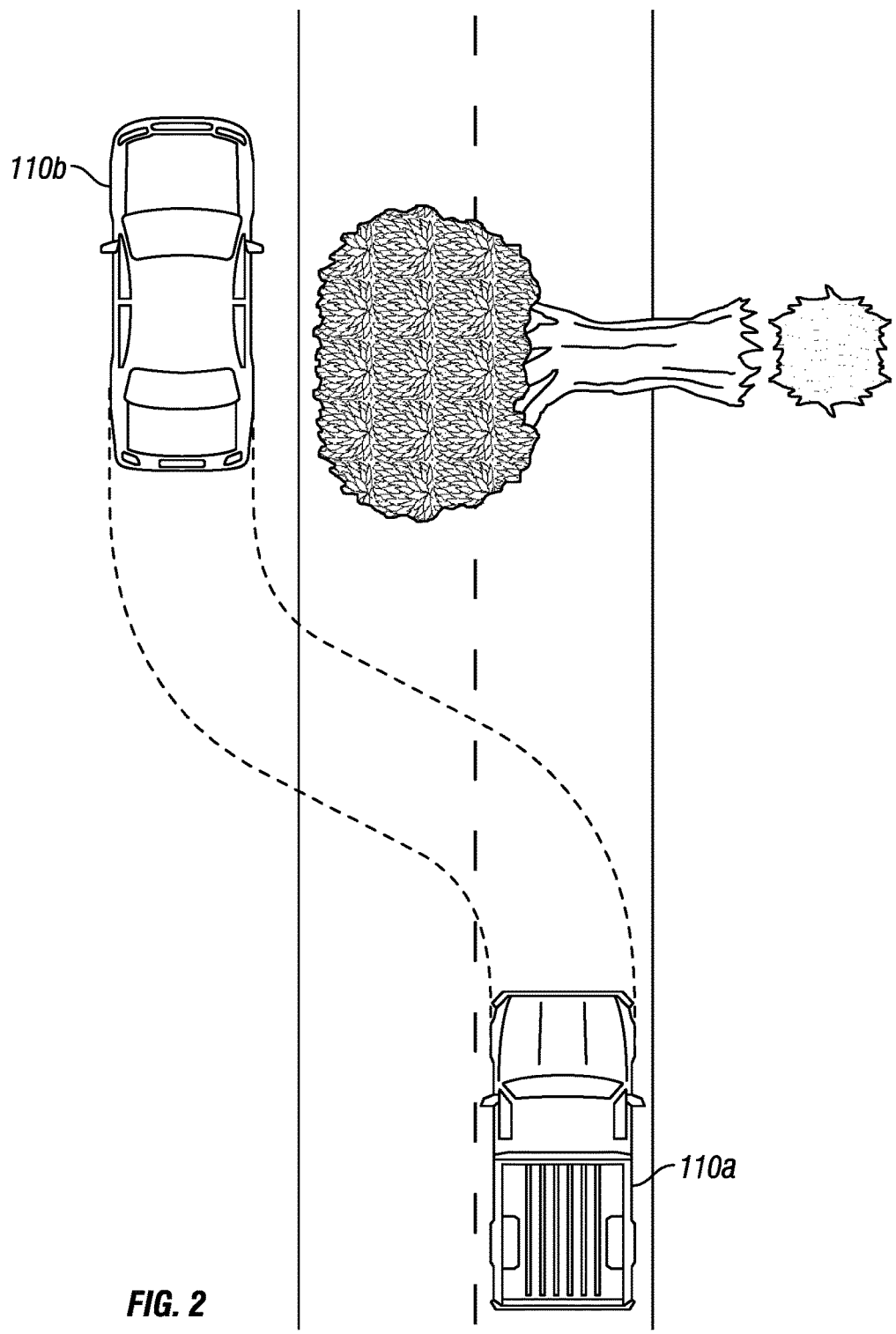
FIG. 2 illustrates an example scenario of a vehicle communicating a signal for assistance.

FIG. 2 illustrates example scenario 200 that illustrates vehicle 110 communicating a signal for assistance. In FIG. 2, vehicle 110a and vehicle 110b are example vehicles that may communicate a signal for assistance in example scenario 200, such as a tree impeding the road.

In certain embodiments, vehicle 110a may communicate a signal for assistance upon a determination of a low confidence level of the environment. For example, vehicle 110a may determine a low confidence level because of an unknown or unexpected object (e.g., broken tree) that is impeding its projected path. Vehicle 110a may then wait for control center 120 to communicate an answer to the signal for assistance in order to pursue a next action. In certain embodiments, vehicle 110a will continuously update a communicated signal for assistance with additional information before receiving an answer.

Control center 120 may communicate an answer to go around the object, turn around, perform a specific driving command, or any other type of action that informs vehicle 110a of what action to take next. Control center 120 may determine an answer to the signal for assistance based in part on a response from the plurality of responses.

Vehicle 110b may be a second vehicle that previously encountered the area that vehicle 110a reported as having a low confidence level. In an example of vehicle 110a reporting a low confidence level because of an unexpected object impeding the road, vehicle 110b may have previously performed an action to go around the impeding object. Vehicle 110b may communicate the performed action, result of the action, or any other information pertaining to the action and/or unexpected object to vehicle 110a and/or control center 120. Vehicle 110a and/or control center 120 may utilize the information communicated in determining a next action for vehicle 110a to take.

Figure 3:
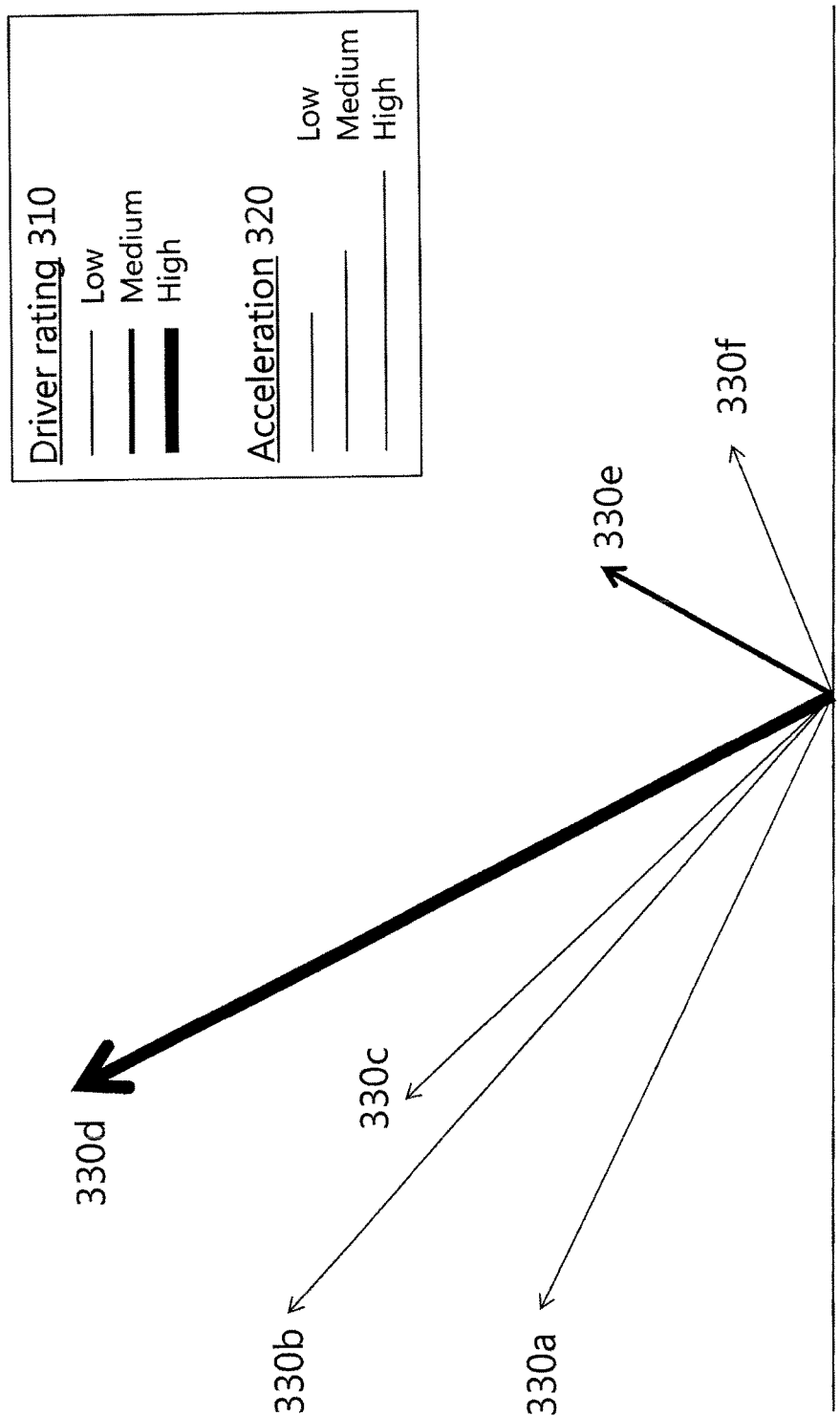
FIG. 3 illustrates an example response map.
Figure 4:
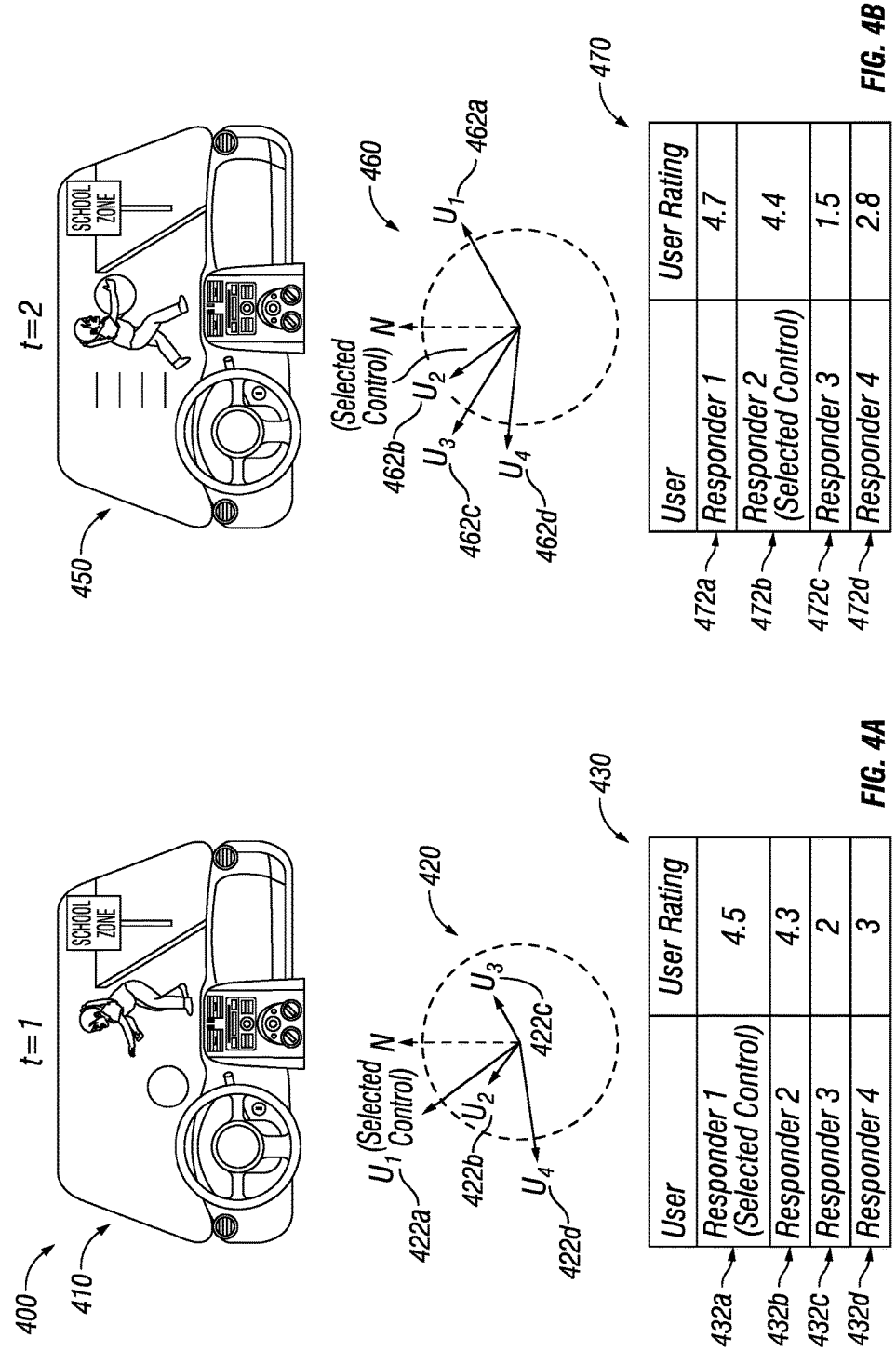
FIGS. 4A and 4B illustrate example scenarios of a control center determining an answer to a signal for assistance.

FIG. 3 illustrates example response map 300. Control center 120 determines an answer to the signal for assistance from the received responses 330a-f (illustrated here as 330a, 330b, 330c, 330d, 330e, and 330f).

Driver rating 310 indicates the rating that is associated with responses 330a-f. The thickness of the line associated with responses 330a-f corresponds with the rating for responder 130 that submitted the response. For example, the responder that submitted response 330d has a higher rating than the responder that submitted response 330c.

Acceleration rating 320 indicates that the length of line associated with responses 330a-f is an indication of the acceleration. Similarly, the direction of the line indicates the proposed direction of the response. As an example, response 330d indicates a high acceleration in the north-northwest direction.

Responses 330a-f represent responses received at control center 120 from responders 130[1-n]. The responses are associated with a direction, acceleration, and driver rating. Control center 120 will determine an answer to the signal for assistance based in part on an analysis of the responses 330a-f and the rating for each responder as described above in FIG. 1.

FIGS. 4A and 4B illustrate example scenarios 400 of control center 120 determining answers to a signal for assistance for vehicle 100.

At time t=1, example scenario 400 is a child running to chase a ball in the street in a school zone in FIG. 4A. Note that vehicle 110 may have already communicated a signal for assistance to control center 120 before time t=1, because vehicle 110 may have determined that it was in a low-confidence situation (e.g., a school zone) prior to time t=1. Accordingly, responders 130[1-n] may have received sensor data associated with vehicle 110 and started providing responses to control center 120 prior to time t=1. Vehicle 110 communicates a signal for assistance to control center 120 at time t=1. Vehicle 110 may also communicate sensor data 410 as part of a signal for assistance.

Control center 120 may determine responders 130[1-n] to provide responses for the signal for assistance. In FIG. 4A, control center 120 elicits responses from Responder 1, Responder 2, Responder 3, and Responder 4. The responses, as outlined in 420, illustrate the various directions and accelerations received from Responder 1, Responder 2, Responder 3, and Responder 4.

Each of the responses 422a-d (illustrated here as 422a, 422b, 422c, and 422d) indicates a proposed response by responder 130. For example, response 422d associated with Responder 4 indicates a proposed response of a left turn.

In an exemplary embodiment, control center 120 determines an answer to the signal for assistance by selecting a response 422 based in part on a rating for responder 130 in rating table 430 and the variance for the response.

In the illustrated embodiment, control center 120 selects response 422a as the selected signal for assistance, because response 422a is similar to response 422b and also the rating 432a associated with Responder 1 is a high rating. As seen in the rating table 430, Responder 1 has the highest rating 432a compared to ratings 432b-d.

Rating table 470 is an adjusted rating table at t=2 based on the previous responses 422a-d in example scenario 400 at time t=1. Control center 120 adjusted rating 472a for Responder 1 upwards from 4.5 to 4.7, because control center 120 selected response 422a associated with Responder 1 as the answer at time t=1. Similarly, control center 120 adjusted rating 472b for Responder 2 upwards from 4.3 to 4.4, because of the little variance between response 422b associated with Responder 2 and selected response 422a associated with Responder 1. The adjustment for rating 472b for Responder 2 is less than the adjustment for rating 472a for Responder 1, because response 422a associated with Responder 1 was the selected response. On the other hand, control center 120 adjusts rating 472c for Responder 3 and rating 472d for Responder 4 downwards, because response 422c associated with Responder 3 and 422d associated with Responder 4 were largely variant than selected response 422a.

At time t=2, example scenario 400 is the child now running to the right in a school zone in FIG. 4B. Vehicle 110 communicates a signal for assistance to control center 120. Vehicle 110 may also communicate sensor data 450 as part of a signal for assistance.

Similar to response map 420, response map 460 outlines the responses received by control center 420 at time t=2. Responders 130[1-n] that responded in response map 420 also responded in response map 460.

Control center 120, again, determines an answer to the signal for assistance by selecting a response 462 based in part on the rating for the responders in rating table 470 and the little variance for the response to other responses 462a-d (illustrated here as 462a, 462b, 462c, and 462d).

In the illustrated embodiment, control center 120 selects response 462b as the selected signal for assistance because response 462b is similar to response 462c and 462d and also the rating 472b associated with Responder 2 is a high rating. Note that while rating 472a associated with Responder 1 is higher than rating 472b associated with Responder 2, control center 420 selected response 472b because rating 472b is higher than rating 472c and 472d and response 462a was highly variant from response 472b, response 472c, and response 472d.

Figure 5:
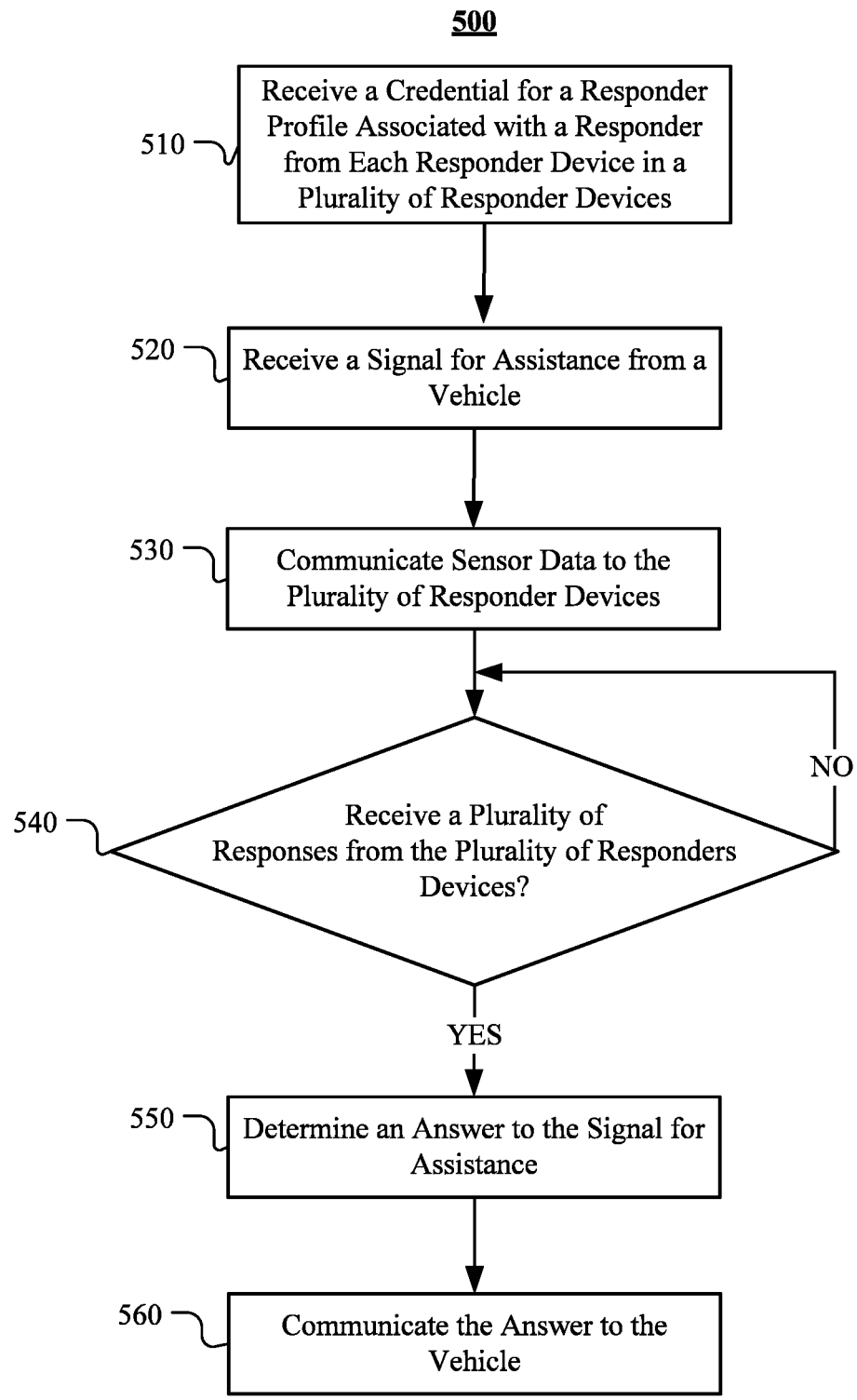
FIG. 5 illustrates an example method for determining a crowd-sourced response to a signal for assistance.

FIG. 5 illustrates an example method 500 for determining a crowd-sourced response to a signal for assistance. The method begins at step 510, where control center 120 receives a credential for responder profile 134 associated with responder 130 from each responder device 132[1] . . . 132[n].

At step 520, control center 120 receives a signal for assistance from vehicle 110. Typically, vehicle 110 communicates a signal for assistance when vehicle 110 determines it is operating at a low confidence level. The signal for assistance may include sensor data associated with vehicle 110.

At step 530, control center 120 communicates sensor data to responder devices 132[1-n]. Each responder device 132[1] . . . 132[n] is associated with responder 130. In certain embodiments, control center 120 determines responders 130[1-n] from among a set of available responders. Available responders may include a set of responders that are available to respond to a signal for assistance. Control center 120 may determine responders 130[1-n] from the set of available responders based on the confidence level associated with the signal for assistance and the rating for responders 130[1] . . . 130[n]. For example, control center 120 may select a large number of responders 130[1-n] with a high rating for a signal for assistance with an extremely low confidence level. Similarly, control center 120 may select a small number of responders 130[1-n] with a mediocre rating for a signal for assistance with a moderate confidence level.

Control center 120 may provide sensor data to responder devices 132[1-n]. Sensor data may include any output data from the one or more cameras or various sensors associated with vehicle 110 and any data related to the environment of vehicle 110.

At step 540, control center 120 receives a plurality of responses from responder devices 132[1-n]. Each response may indicate a possible action to be taken by vehicle 110. An example action for vehicle 110 may be an instantaneous movement, a change of direction, and/or an acceleration/deceleration. If control center 120 does not receive a plurality of responses from responder devices 132[1-n], control center 120 may wait to receive the plurality of responses from responder devices 132[1-n]. Otherwise, control center 120 may proceed to step 550.

At step 550, control center 120 determines an answer to the signal for assistance. An answer may indicate an action for vehicle 110 to take. Control center 120 may determine an answer based in part on a response from the plurality of responses. Control center 120 may also determine an answer to the signal for assistance based in part by computing a score for each response and selecting a highly-ranked response. Control center 120 may compute a score for each response based at least in part a variance for each response and a rating for responder 130 associated with responder device 132 that communicated the response.

At step 560, control center 120 communicates the determined answer to vehicle 110. The communication may include a direction and acceleration of the next movement for vehicle 110. In certain embodiments, the communication may be in a format such that vehicle 110 may take the next action based on the received answer. For example, an answer may include instructions to maintain the steering wheel direction and decrease the speed by 5 miles per hour, and vehicle 110 will perform the instructions once the answer is received.

Modifications, additions, or omissions may be made to method 500 depicted in FIG. 5. Method 500 may include more, fewer, or other steps. For example, control center 120 may continuously receive updated signals for assistance from vehicle 110. Steps may also be performed in parallel or in any suitable order. While discussed as specific components completing the steps of method 500, any suitable component of network environment 100 may perform any step of method 500.

Figure 6:
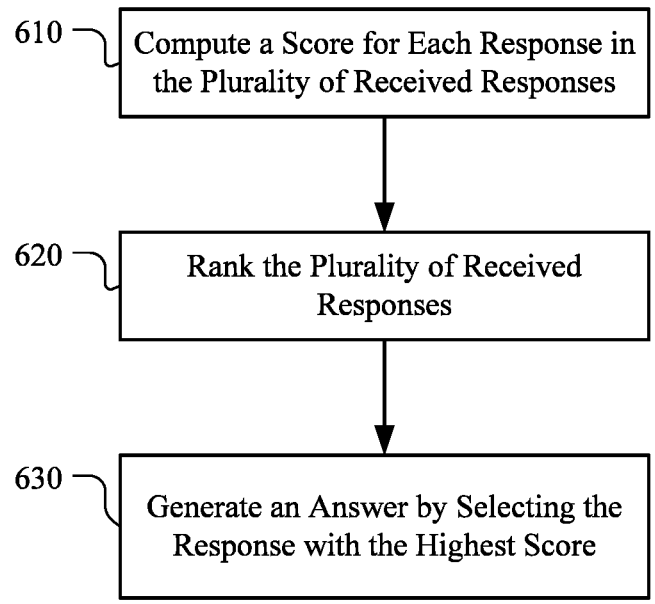
FIG. 6 illustrates an example method for selecting a response based on a ranking of the plurality of responses.

FIG. 6 illustrates an example method 600 for selecting a response based on a ranking of the plurality of responses.

The method begins at step 610, where control center 120 calculates a score for each response in the plurality of received responses. For example, the score for a response may be based in part on a variance for the response and a rating for responder 130 associated with responder device 132 that communicated the response.

At step 620, control center 120 ranks the plurality of received responses according to the score calculated for each response.

At step 630, control center 120 generates an answer to the signal for assistance by selecting the response with the highest score. In alternative embodiments, control center 120 may then select a response that is ranked greater, lower, or equal to a predetermined threshold. A predetermined threshold may be set as an absolute score or as the score of the lowest-ranked response. In other embodiments, control center 120 may perform a statistical analysis on a set of responses that are ranked higher or lower than a predetermined threshold, and develop an answer based on that statistical analysis.

Modifications, additions, or omissions may be made to method 600 depicted in FIG. 6. Method 600 may include more, fewer, or other steps. For example, control center 120 may rank the plurality of responses while computing a score for each response. Steps may also be performed in parallel or in any suitable order. While discussed as specific components completing the steps of method 600, any suitable component of network environment 100 may perform any step of method 600.

Figure 7:
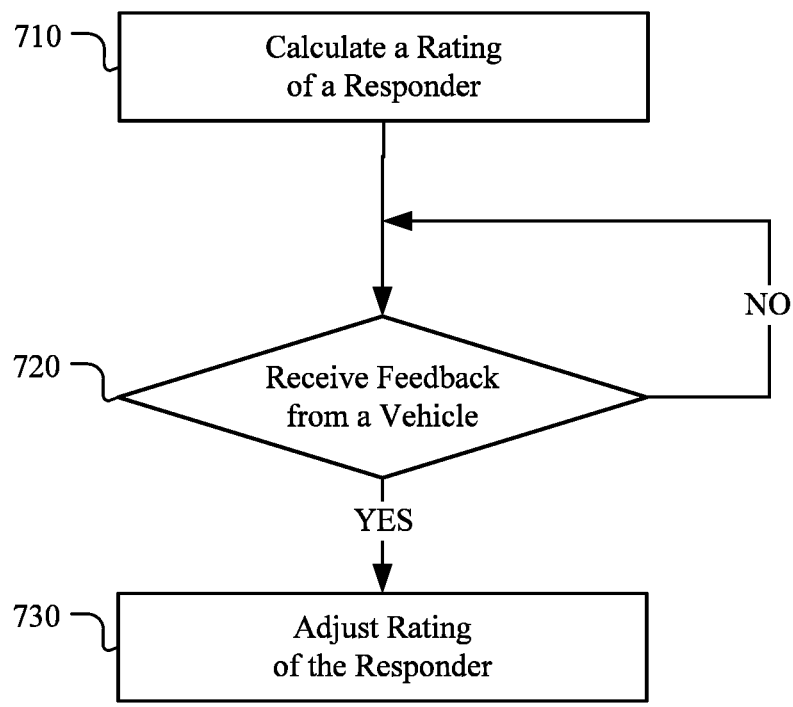
FIG. 7 illustrates an example method for adjusting the rating for a responder based on feedback received from a vehicle.

FIG. 7 illustrates an example method 700 for adjusting the rating for a responder based on feedback received from vehicle 110.

The method begins at step 710, where control center 120 calculates a rating for responder 130. Control center 120 may utilize the following characteristics to calculate a rating: a number of miles driven by responder 130; an amount of time driven by responder 130; a number of driving accidents caused by responder 130; a number of previous responses communicated by responder device 132 associated with responder 130; experience of responder 130 with a zoning of an area associated with vehicle 110; experience of responder 130 with one or more types of vehicles similar to vehicle 110; feedback associated with the previous responses communicated by responder device 132 associated with responder 130; a rating for responder 130 by an occupant in vehicle 110; and a relationship between the occupant and the responder 130.

At step 720, control center 120 receives feedback from vehicle 110. In certain embodiments, control center 120 may update a calculation used to determine a subsequent answer based at least in part on the received feedback from vehicle 110. For example, control center 120 may update its weighted average equation (e.g., Equation 2) used to calculate the score for the responses based at least in part on the received feedback from vehicle 110. If control center 120 does not receive feedback from vehicle 110, control center 120 may wait to receive feedback from vehicle 110. Otherwise, control center 120 may proceed to step 730.

At step 730, control center 120 adjusts the rating for responder 130. The severity of adjustment of the rating for responder 130 may be based on the variance for the response corresponding to responder 130; received feedback from vehicle 110 and/or occupants in vehicle 110; latency of the response by responder device 132 associated with responder 130; and/or other factors that indicate whether responder 130 efficiently selected a proper or improper decision as the next action for vehicle 110 to take. In certain embodiments, control center 120 adjusts the rating for responder 130 by an increment.

Modifications, additions, or omissions may be made to method 700 depicted in FIG. 7. Method 700 may include more, fewer, or other steps. For example, control center 120 may receive feedback from vehicle 110 that addresses multiple issues. Steps may also be performed in parallel or in any suitable order. While discussed as specific components completing the steps of method 700, any suitable component of network environment 100 may perform any step of method 700.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method, comprising:
receiving at a control center comprising a processor and a memory, from each responder device in a plurality of responder devices, a credential for a responder profile associated with a responder;
receiving at the control center, from a vehicle, a signal for assistance, wherein the signal for assistance comprises sensor data associated with the vehicle;
communicating the sensor data from the control center to the responder devices;
receiving at the control center a plurality of responses, each of the responses being received from one of the responder devices, wherein each response indicates a possible action to be taken by the vehicle;
determining, in the control center, based at least in part on a response from among the received responses, an answer to the signal for assistance, wherein the answer indicates an action to be taken by the vehicle; and
communicating the determined answer from the control center to the vehicle.

2. The method of claim 1, wherein determining the answer comprises performing a calculation and further comprising:
receiving at the control center, feedback from the vehicle; and
updating, in the control center, based at least in part on the feedback from the vehicle, a calculation used to determine a subsequent answer.

3. The method of claim 1, Wherein determining, based at least in part on the response from the plurality of responses, the answer comprises:
calculating, in the control center, a variance for each response by comparing each response to the plurality of responses;
calculating, in the control center, based at least in. part on the variance for each response, a score for each response;
ranking, in the control center, the plurality of responses according to the score calculated for each response; and
generating, in the control center, the answer by selecting the response with the highest score.

4. The method of claim 3, wherein calculating, in the control center, based at least in part on the variance for each response, a score for each response comprises calculating, in the control center, based in part on the variance for each response and a rating for the responder associated with the responder device that communicated the response, a score for each response.

5. The method of claim 1, wherein determining, in the control center, based at least in part on the response from among the plurality of received responses, the answer to the signal for assistance comprises generating, in the control center, the answer by selecting a response from the plurality of responses that is based at least in part on a rating for the responder associated with the responder device that communicated the response.

6. The method of claim 5, wherein the rating for the responder is calculated based in part on at least one of the following characteristics:
a number of miles driven by the responder;
an amount of time driven by the responder;
a number of driving accidents caused by the responder;
a number of previous responses communicated by the responder device associated. with the responder;
experience of the responder with a zoning of an area associated with the vehicle;
experience of the responder with a vehicle category associated with the vehicle;
feedback associated with the previous responses communicated by the responder device associated with the responder;
a rating for the responder by an occupant of the vehicle; and
a relationship between the occupant and the responder.

7. The method of claim 5, further comprising adjusting, in the control center, based in part on the selected response, the rating for the responder.

8. The method of claim 7, wherein adjusting, in the control center, based in part on the selected response, the rating for the responder comprises adjusting, in the control center, based in part on the selected response, the rating for the responder by an increment, wherein the increment is determined based in part on at least one of the following criteria:
a variance for the response from the responder device associated with the responder, wherein the variance for the response is calculated by comparing the response to the selected response;
feedback from the vehicle; and
a latency of the response from the responder device associated with the responder.

9. The method of claim 1, further comprising determining, in the control center, the plurality of responders from among a set of available responders.

10. The method of claim 9, further comprising:
calculating, in the control center, a confidence level associated with the signal for assistance; and wherein
determining, in the control center, the plurality of responders from among a set of available responders comprises determining, in the control center, the plurality of responders from among a set of available responders by selecting the plurality of responders based on the confidence level associated with the signal for assistance and a rating for each responder.

11. The method of claim 10, wherein calculating, in the control center, the confidence level associated with the signal for assistance comprises calculating, in the control center, the confidence level associated with the signal for assistance based in part on at least one of the following characteristics:
an identification of an unexpected object in an area associated with the vehicle;
an awareness level of an occupant in the driver seat in the vehicle;
a number of accidents reported in the area associated with the vehicle;
a number of objects in a predetermined proximity to the vehicle;
a zoning of the area associated with the vehicle; and
a failure of one or more sensors associated with the vehicle.

12. One or more computer-readable non-transitory storage media embodying software that is operable when executed to:
receive, from each responder device in a plurality of responder devices, a credential for a responder profile associated with a responder;
receive, from a vehicle, a signal for assistance, wherein the signal for assistance comprises sensor data associated with the vehicle;
communicate the sensor data to the plurality of responder devices;

receive a plurality of responses, each of the responses being received from one of the responder devices, wherein each response indicates a possible action to be taken by the vehicle;

determine, based at least in part on a response from among the received responses, an answer to the signal for assistance, wherein the answer indicates an action to be taken by the vehicle; and communicate the determined answer to the vehicle.

13. The media of claim 12, wherein determining, based at least in part on a response from the plurality of responses, an answer to the signal for assistance comprises:

calculating a variance for each response by comparing each response to the plurality of responses;

calculating based at least in part on the variance for each response, a score for each response;

ranking the plurality of responses according to the score calculated for each response; and generating an answer by selecting the response with the highest score.

14. The media of claim 12, wherein determine, based at least in part on the response from among the plurality of received responses, an answer to the signal for assistance comprises generate an answer by selecting a response from the plurality of responses that is based at least in part on a rating for the responder associated with the responder device that communicated the response.

15. The media of claim 14, wherein the software is further operable when executed to calculate the rating for the responder based in part on at least one of the following characteristics:

a number of miles driven by the responder;
an amount of time driven by the responder;
a number of driving accidents caused by the responder;
a number of previous responses communicated by the responder device associated with the responder;
experience of the responder with a zoning of an area associated with the vehicle;
experience of the responder with a vehicle category associated with the vehicle;
feedback associated with the previous responses communicated by the responder device associated with the responder;
a rating for the responder by an occupant of the vehicle; and
a relationship between the occupant and the responder.

16. The media of claim 12, wherein the software is further operable when executed to adjust, based in part on the selected response, the rating for the responder.

17. A system comprising one or more processors and a memory coupled to the processors comprising instructions executable by the processors, the processors being operable when executing the instructions to:

receive, from each responder device in a plurality of responder devices, a credential for a responder profile associated with a responder;

receive, from a vehicle, a signal for assistance, wherein the signal for assistance comprises sensor data associated with the vehicle;

communicate the sensor data to the plurality of responder devices;

receive a plurality of responses, each of the responses being received from one of the responder devices, wherein each response indicates a possible action to be taken by the vehicle;

determine, based at least in part on a response from among the received responses, an answer to the signal for assistance, wherein the answer indicates an action to be taken by the vehicle; and communicate the determined answer to the vehicle.

18. The system of claim 17, wherein determining, based at least in part on a response from the plurality of responses, an answer to the signal for assistance comprises:

calculating a variance for each response by comparing each response to the plurality of responses;

calculating based at least in part on the variance for each response, a score for each response;

ranking the plurality of responses according to the score calculated for each response; and generating an answer by selecting the response with the highest score.

19. The system of claim 17, wherein determine, based at least in part on the response from among the plurality of received responses, an answer to the signal for assistance comprises generate an answer by selecting a response from the plurality of responses that is based at least in part on a rating for the responder associated with the responder device that communicated the response.

20. The system of claim 19, wherein the processors are further operable when executing the instructions to calculate the rating for the responder based in part on at least one of the following characteristics:

a number of miles driven by the responder;
an amount of time driven by the responder;
a number of driving accidents caused by the responder;
a number of previous responses communicated by the responder device associated with the responder;
experience of the responder with a zoning of an area associated with the vehicle;
experience of the responder with a vehicle category associated with the vehicle;
feedback associated with the previous responses communicated by the responder device associated with the responder;
a rating for the responder by an occupant of the vehicle; and
a relationship between the occupant and the responder.

* * * * *